United States Patent
Vougioukas et al.

(10) Patent No.: US 10,763,990 B1
(45) Date of Patent: Sep. 1, 2020

(54) SWITCHING FREQUENCY METHODS AND APPARATUS FOR AMBIENT BACKSCATTER NETWORKING AND JAMMING

(71) Applicants: Georgios Vougioukas, Chania (GR); Aggelos Bletsas, Chania (GR)

(72) Inventors: Georgios Vougioukas, Chania (GR); Aggelos Bletsas, Chania (GR)

( * ) Notice: Subject to any disclaimer, the term of this patent is extended or adjusted under 35 U.S.C. 154(b) by 0 days.

(21) Appl. No.: 16/367,875

(22) Filed: Mar. 28, 2019

(51) Int. Cl.
*H04K 3/00* (2006.01)
*H04B 1/40* (2015.01)
*H04L 5/14* (2006.01)
*H04B 1/30* (2006.01)

(52) U.S. Cl.
CPC .............. *H04K 3/60* (2013.01); *H04B 1/30* (2013.01); *H04B 1/40* (2013.01); *H04L 5/14* (2013.01)

(58) Field of Classification Search
CPC ... H04B 7/04; H04B 1/40; H04K 3/25; H04K 3/60

USPC .......................................... 455/1, 66.1, 67.11
See application file for complete search history.

(56) References Cited

U.S. PATENT DOCUMENTS 9,973,367 B2 * 5/2018 Gollakota ................ H04K 3/25
2018/0375703 A1 * 12/2018 Kellogg .................. G01S 13/82

* cited by examiner

*Primary Examiner* — John J Lee

(57) ABSTRACT

Two ambient backscatter modulation methods and embodiments are disclosed, pseudo FSK and shifted BPSK. Embodiments of a receiver of signals for those modulations are also disclosed. Both methods disclosed allow for frequency-based networking of multiple backscatter devices when signals from an ambient, modulated radio frequency (RF) source are used for illumination. Disclosed method and apparatus exploit the inherent variation of the ambient modulated illuminating signal and offers performance improvement. Aspects of the disclosed invention also provide methods for passive jamming of full duplex transceivers and methods for assisting RF source localization.

3 Claims, 7 Drawing Sheets

US 10,763,990 B1

SWITCHING FREQUENCY METHODS AND APPARATUS FOR AMBIENT BACKSCATTER NETWORKING AND JAMMING

BACKGROUND OF THE INVENTION

The present invention is in the technical field of wireless transmission and reception of information. More particularly, the present invention is in the technical field of ultra-low power backscatter radio communication. Embodiments and aspects of part of the invention described herein, focus on digital bistatic backscatter radio; the illuminator of a tag and the receiver of the backscattered information (from the tag) are distinct units, located at different points in space.

The illuminating signal may be modulated and/or emitted from legacy wireless systems or infrastructure (ambient case).

Embodiments and aspects of part of the invention described herein, are inspired by recent findings in digital bistatic backscatter radio [Bletsas et al 12a], [Bletsas et al 12b], [Bletsas et al 13] (where the illuminating signal is unmodulated) and ambient backscatter radio (where the illuminating signal is modulated and carries its own information). Although easy and straightforward to implement, current methods [Smith et al 13] and [Smith et al 14] either exploit on-off keying (OOK) modulation at the tag or utilize detection schemes with significant trade-offs between communication range and information transmission rate. Additionally, the structure and/or modulation of the ambient signal is explicitly considered. Moreover, current methods require multiple access from multiple tags utilizing time division multiple access (TDMA) or code division multiple access (CDMA), which increases complexity and cost of the overall system. Methods for analog ambient backscatter have been also proposed [Smith et al 17] and [Bletsas et al 17]. Such methods provide analog information transmission, while requiring a frequency modulated (FM) ambient carrier to operate according to their intended purpose.

SUMMARY OF THE INVENTION

The present invention discloses methods and apparatus for ultra-low power wireless transmission and reception of information. Two methods and apparatus for backscattering information when the illuminating radio frequency (RF) signal is a modulated signal, namely pseudo FSK and shifted BPSK, are disclosed. Methods and apparatus for receiving signals resulting from embodiments of the backscattering methods pseudo FSK and shifted BPSK, are also disclosed.

Pseudo FSK modulation is designed so as to operate when the (modulated) signal of the ambient illuminating carrier is of constant envelope modulation. In pseudo FSK modulation, wireless channel parameters are assumed constant for the duration of a certain number of bits. Reception of pseudo FSK is fully coherent and estimation of related parameters is performed through short training sequences.

Shifted BPSK modulation is designed so as to operate with any (modulated) signal of the ambient illuminating carrier, irrespective of its modulation or structure. An aspect of shifted BPSK also utilizes error correction channel coding. Reception method of channel-coded or channel-uncoded shifted BPSK-modulated backscattered signals, does not need any information regarding the ambient illuminating signal.

A short training sequence backscattered from the tag is utilized for acquiring a tag and wireless channel related phase. The methods and apparatus of embodiments of this invention allows for reliable backscatter communication; the existence of modulation at the ambient illuminator is turned to an advantage by this invention. More particularly, reliability of backscatter communication is increased.

Both backscatter modulation methods offer a straightforward way for multiple access in the frequency domain. Multiple access in the frequency domain can be exploited for networking purposes, without requiring receivers or codes at each tag.

Thus, multiple access from several tags is possible without TDMA or CDMA methods.

DETAILED DESCRIPTION OF THE INVENTION

Figure 1:
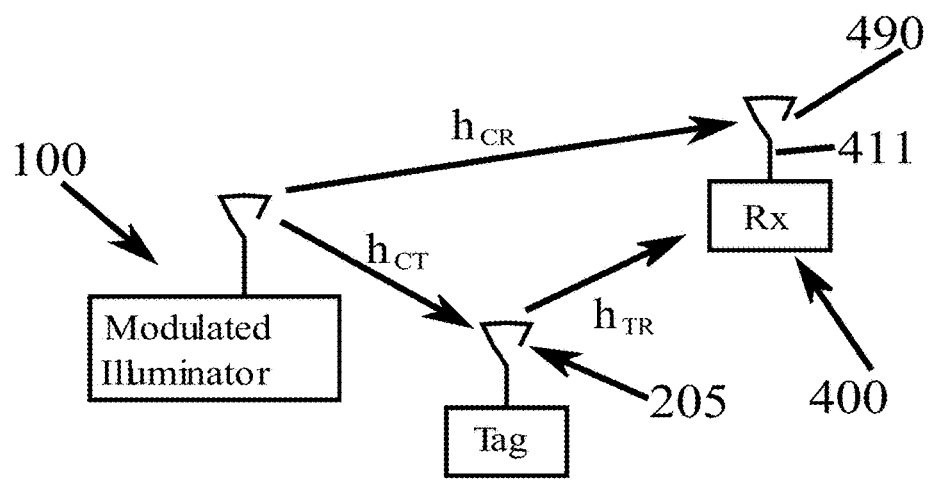
FIG. 1 shows a setup for utilization of an embodiment of part of the invention.

An illuminator 100 transmits a modulated signal, destined to its own, legacy receiver (FIG. 1). The same signal illuminates the tag antenna 205 in FIG. 1; the tag modulates its own information on the already modulated illuminating signal, by careful reflection. The tag antenna-reflected signal is received by the receiver (Rx) 400, through the receiver antenna 490 (FIG. 1).

Figure 2:
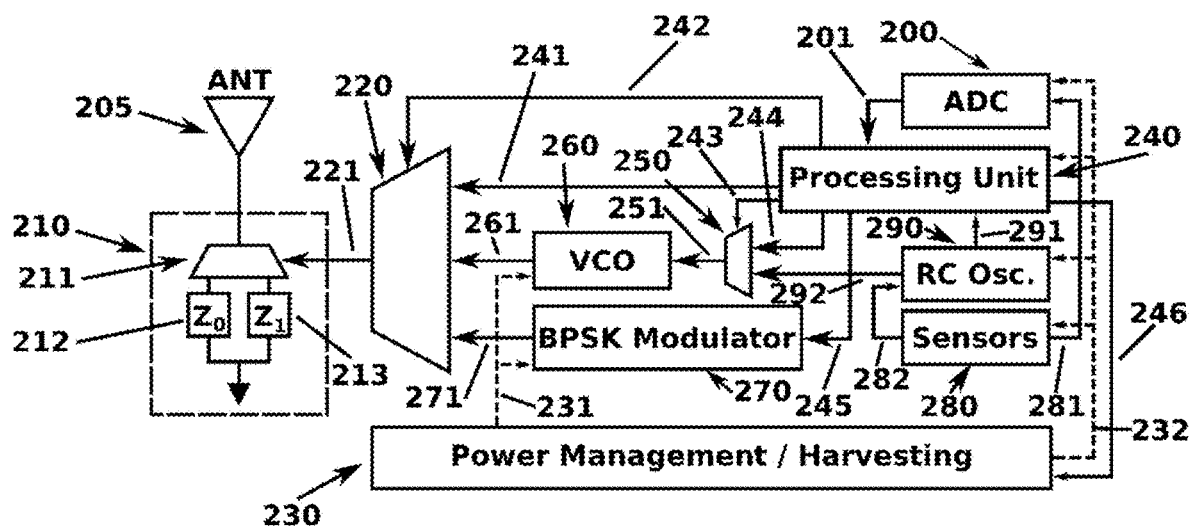
FIG. 2 shows an embodiment of part of the invention, a backscatter tag.

One embodiment of part of the invention, the backscatter tag, is shown in FIG. 2. Backscatter tag consists of an antenna 205 connected to a radio frequency (RF) termination switching module 210. The RF switching module consists of a RF switch 211 and two complex impedances 212 and 213. Antenna 205 is connected to either complex impedance (load) $Z_0$ 212 or complex impedance (load) $Z_1$ 213 by RF switch 211.

Load connected to the tag antenna, at any given time instant, is selected based on the value of a binary signal 221, driving the RF switch. Binary signal 221 is the output of a multiplexer 220. Based on a signal 242, the output 221 of the multiplexer 220 is a signal 241 or a signal 261 or a signal 271. Only one of signals 241, 261, 271 can be assigned to signal 221 at a specific time instant.

In the step of producing pseudo FSK (FIG. 3, left waveforms) backscatter modulation, a Processing Unit 240 drives multiplexer 220 via the signal 242. Processing Unit 240 drives signal 242 such that signal 241 is assigned to signal 221. In this step, RF switch 211 alternates the loads according to signal 241, produced by Processing Unit 240.

When bit 1 is to be backscattered under pseudo FSK backscatter modulation, a square wave of frequency $F_{sw}$ is generated by Processing Unit 240 for the duration of the bit. The square wave produced in Processing Unit 240 is assigned to signal 241. That way RF switch 211 alternates between the load 212 and the load 213, for the duration of the bit at an alternation rate of $F_{sw}$. The 2 levels of the produced square wave correspond to the levels accepted by the RF switch 211.

Figure 3:
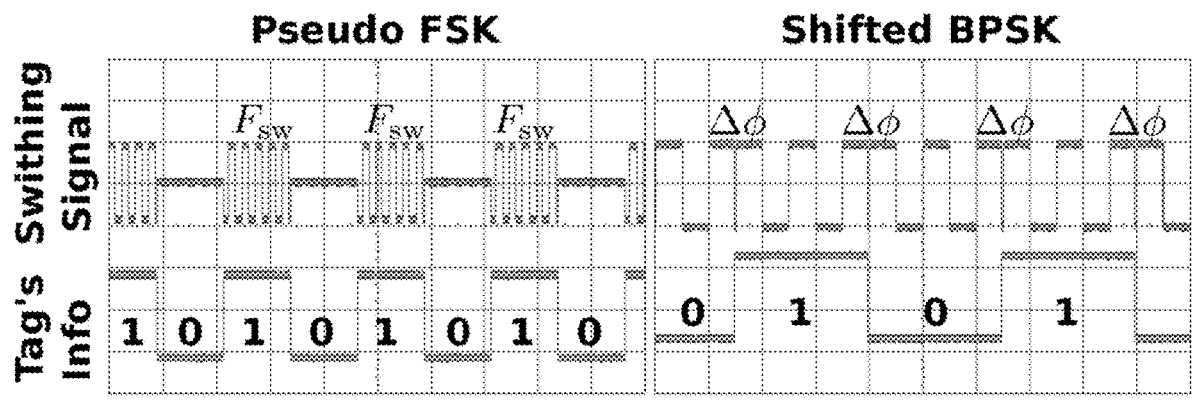
FIG. 3 shows waveforms produced by an embodiment of the backscatter tag.

When bit 0 is to be backscattered (under pseudo FSK), Processing Unit 240 assigns to signal 241 a direct current (DC) waveform. The direct current (DC) waveform attains either the high or low state for time duration equal to the bit duration. Such high or low state is the same as the high or low state of the square wave produced for backscattering bit 1. That way the RF switch 211 selects one of the two termination loads for the duration of bit 0. An example of signal 241 is depicted at FIG. 3 left and top.

In the step of producing shifted BPSK (FIG. 3 right waveforms), Processing Unit 240 assigns to signal 242 a value such that the signal 271 is assigned to the signal 221 via the multiplexer 220. In this step, RF switch 211 alternates the loads according to signal 271, produced by a BPSK Modulator 270, explained in detail below.

Under shifted BPSK modulation, the BPSK Modulator 270 produces signal 271 depending on a signal 245. In the embodiment in FIG. 2, signal 245 is produced by Processing Unit 240 based on the bits to be backscattered. Signal 245 is a square pulses train, with the level of each pulse corresponding to the bit to be backscattered, at the specific time instant. Processing Unit 240 is able to choose whether or not to utilize an error correction code on the bit sequence to be assigned on signal 245. BPSK Modulator 270 produces a square wave (which is assigned to signal 271) of frequency $F_{sw}$, with its phase depending on the value of signal 245. Phases introduced in the embodiment of the present description are $$\phi_1 = \frac{\pi}{2}$$

when signal 245 dictates backscattering bit 1 and $\phi_0=0$ when bit 0 is to be backscattered. In another embodiment, BPSK Modulator is adjustable, offering other values for produced phases. Phase $$\phi_1 = \frac{\pi}{2}$$

is mapped to the square wave by introducing an initial time shift equal to a quarter of the inverse $F_{sw}$ to the said square wave. Phase $\phi_0=0$ is mapped by not introducing an initial phase. An example of signal 271 is depicted in FIG. 3 right and top.

Embodiment in FIG. 2 facilitates multiple sensors denoted by Sensors block 280. Each sensor may be active or passive. Capacitive and resistive sensing elements, whose characteristic value (i.e., capacitance or resistance, respectively) changes with respect to a measured quantity, constitute passive sensors. Passive sensors do not require external supply to translate a measured quantity to an inherent electrical characteristic (resistance, capacitance, voltage, current etc.). Sensing elements that require some form of power supply to translate a measured quantity to a measurable electrical characteristic (resistance, capacitance, voltage, current etc.), constitute active sensors. Sensors block 280 is considered to facilitate passive or active signal conditioning modules for interfacing the passive or active sensors.

For passive sensing elements (resistive or capacitive), interfacing with the Processing Unit 240 is done through a resistor/capacitor (RC) oscillator 290. RC oscillator 290 produces a periodic wave of which the frequency depends on the values of the passive sensing element(s), part of Sensors block 280. Periodic wave produced by RC oscillator 290 is assigned to a signal 291 and a signal 292. Processing Unit 240 performs frequency counting on signal 291 and computes the value measured by the passive sensing element(s). Processing Unit 240 arranges the necessary bit sequence, corresponding to the measured value and performs the preferred (pseudo FSK or shifted BPSK) backscattering operation.

Values of passive sensors can be also backscattered in an analog manner utilizing principles shown in [Bletsas et al 17]. In the embodiment in FIG. 2, such an operation is done through a multiplexer 250 and a voltage controlled oscillator (VCO) 260. Processing Unit 240 assigns to a signal 243 a value such that the multiplexer 250 assigns to a signal 251 the signal 292 from RC oscillator 290. Processing Unit 240 then assigns to signal 242 a value corresponding to multiplexer 220 assigning to signal 221 the signal 261. That way the RF switch 211 alternates between the loads 212 to 213, based on the output 261 of voltage controlled oscillator (VCO) 260 and the operation of [Bletsas et al 17] is obtained.

In another implementation example, Processing Unit 240 assigns to the signal 243 a value such that the multiplexer 250 assigns to signal 251 a signal 244. That way, Processing Unit 240 can directly assign via the signal 251, values to the voltage controlled oscillator (VCO) 260. This operation allows for Processing Unit 240 to encode information to be frequency modulated by the voltage controlled oscillator (VCO) 260.

For active sensors facilitated in Sensors block 280 of the embodiment in FIG. 2, an analog to digital converter (ADC) 200 is utilized. After signal conditioning is performed on Sensors block 280, offering a voltage value corresponding to a measured quantity, the analog to digital converter (ADC) 200 measures the voltage through signal 281. Processing Unit 240 then receives samples from the analog to digital converter (ADC) 200 through a signal 201, arranges the appropriate bit sequence and backscatters using the preferred (pseudo FSK or shifted BPSK) backscattering operation.

In the embodiment in FIG. 2, a Power Management system 230 is considered. Power Management system 230 supplies power to all the components in the system, using signals 231 and 232. Processing Unit 240 communicates with Power Management system 230 using signal 246. Processing Unit 240 may control Power Management system 230 so as to selectively power off parts of the embodiment in FIG. 2 when not used at a specific time instant.

Power Management system 230 may harvest power from various ambient sources. In the embodiment described, no specific harvesting source is considered. In another embodiment, specific harvesting elements e.g., solar panels or radio frequency (RF) energy harvesting circuitry can be utilized.

Processing Unit 240 must select which backscattering method will be employed to backscatter a specific number of bits. The selection is made between 2 digital methods, pseudo FSK and shifted BPSK. A third method is also available in the embodiment in FIG. 2, based on communication principles presented in [Bletsas et al 17].

When the modulation structure of ambient illuminating carrier 100 (FIG. 1) attains the form of a constant envelope modulated signal and wireless channel parameters remain constant for the duration of a backscattered packet, Processing Unit 240 will be adjusted so as to utilize pseudo FSK. In the case when no information about the ambient carrier is available, Processing Unit 240 will utilize shifted BPSK. Error correction coding can be also utilized under shifted BPSK modulation. In another embodiment of part of the invention, when ambient illuminating carrier 100 (FIG. 1) emits an unmodulated carrier, either of the methods can be utilized.

Other modulation selection criteria may be applied. Available energy based selection may be utilized when small amounts of energy are available through Power Management system 230.

Figure 4:
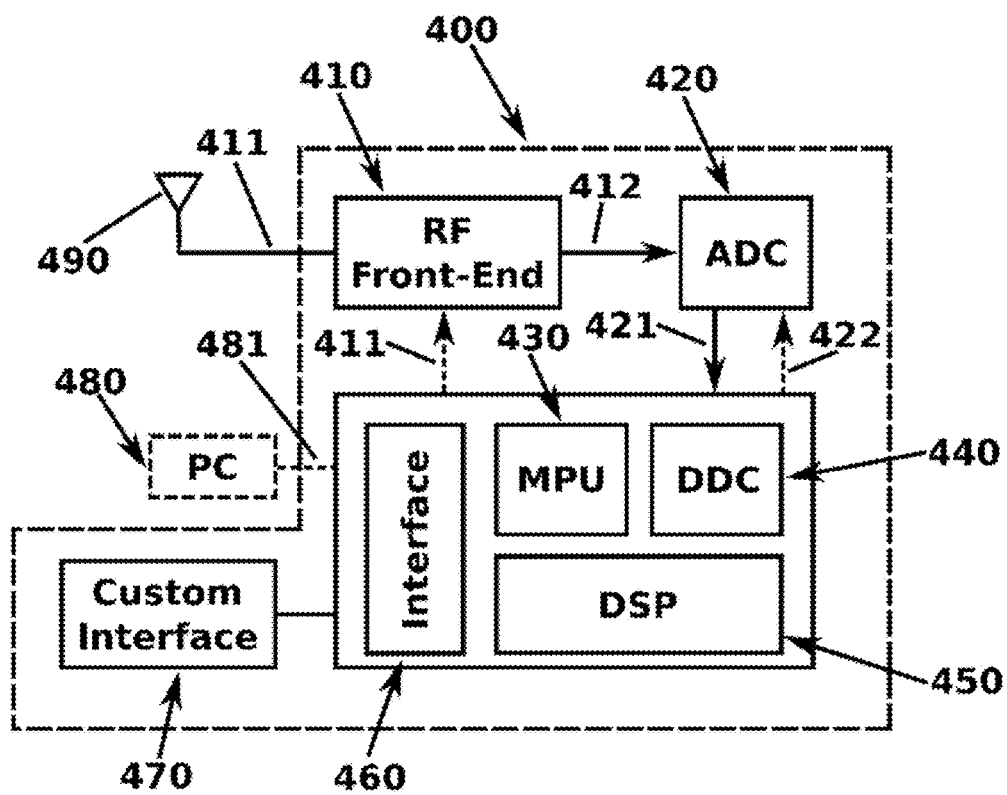
FIG. 4 shows an embodiment of another part of part of the invention, a receiver.

One embodiment of a second part of the invention, a receiver 400, is shown in FIG. 4. Embodiment of the receiver shown in FIG. 4 includes components that extract information from the signal backscattered from tag of the embodiment in FIG. 2.

An antenna 490 is connected through 411 to the receiver 400. An RF Front-End 410 is utilized. The RF Front-End 410 is utilized in order for band pass filtering around a specific frequency to be implemented and an initial down-conversion to an intermediate frequency (IF) analog signal 412 to be achieved. The analog signal 412 is then sampled by an analog to digital converter (ADC) 420 at a rate required for handling the bandwidth of the analog signal 412. The sampled, digitized version of the analog signal 412 is a signal 421. For homodyne reception, the signal 421 is further downconverted using a digital downconverter (DDC) 440. In another embodiment, the RF Front-End 410 utilizes mixers that downconvert the incoming signals from the antenna 490 through signal 411, directly to baseband (homodyne reception). RF Front-End also includes low pass filters to limit the spectral components of the downconverted signal within a desired baseband bandwidth. In such an alternative embodiment, use of the digital downconverter (DDC) is omitted.

After sampling and downconversion to baseband, a digital signal processing (DSP) module 450 implements signal processing methods in order for the backscattered bits to be recovered. After recovering the bits, an Interface module 460 handles the communication with an outside entity. A smartphone or a computer may constitute outside entities. In the embodiment in FIG. 4, a computer (PC) 480 may be used to acquire and/or visualize the recovered information. A Custom Interface 470 is part of the receiver to acquire/visualize the recovered data without the need of a computer (PC) 480. The communication between Interface module 460, digital downconverter (DDC) 440 and digital signal processing (DSP) module 450, is controlled by a microprocessor unit (MPU) 430. Signals 422 and 411 are used by the microprocessor unit (MPU) 430 to control RF Front End 410 and analog to digital converter (ADC) 420 operation. In other embodiments, MPU 430 and DSP 450 modules are not distinct entities.

In the case where ambient illuminating carrier 100 (FIG. 1) provides a constant envelope modulated signal and the wireless channel parameters do not change for the duration of a backscattered packet, coherent detection can be applied. Two correlators with complex exponential basis functions are implemented in the digital signal processing (DSP) module 450. Correlators use samples corresponding to the duration of the bit to be detected. Correlator operation for appropriate bit-level synchronization is equivalent to match filtering. One correlator is used for frequency $F_{sw}$ and another for $-F_{sw}$.

Denoting as r a vector output of the 2 correlators, corresponding to the received, filtered signal for one bit, a coherent maximum likelihood (ML) detection rule is $\|r-\mu_r\|_2^2 \lessgtr \|r\|_2^2$.

$\mu_r$ is a compound parameter that is assumed unchanged for the duration of the backscattered packet. Parameter $\mu_r$ includes tag and wireless channel related parameters. Additionally, $\mu_r$ includes statistics of the signal of the ambient illuminating carrier. Rule $\|r-\mu_r\|_2^2 \lessgtr \|r\|_2^2$ is implemented in the digital signal processing (DSP) module 450. It should be noted that the expressions assume perfect synchronization and carrier frequency offset (CFO) correction.

Parameter $\mu_r$ can be estimated using a short training sequence. Training sequence is known to both the Processing Unit 240 of the backscatter tag of the embodiment in FIG. 2 and the digital signal processing (DSP) module 450 in the embodiment in FIG. 4. The estimation is done through a least squares (LS) estimator or a linear minimum mean squared error (LMMSE) estimator, implemented in digital signal processing (DSP) module 450.

Figure 5:
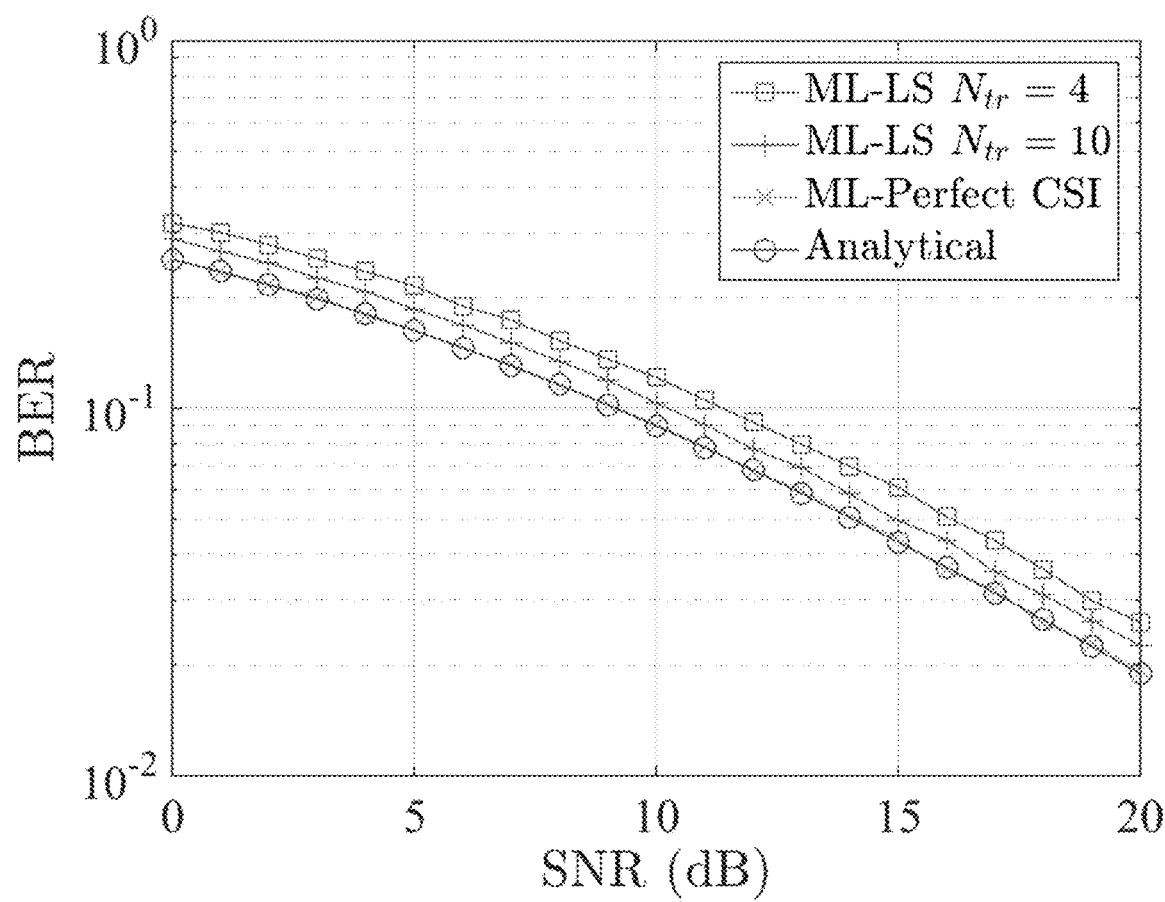
FIG. 5 shows a performance of an embodiment of the receiver for pseudo FSK modulation.

The performance of an embodiment of the receiver for pseudo FSK with respect to bit error rate (BER), is shown in FIG. 5. It can be observed that an analytical bit error rate (BER), closed form expression corresponding to the detection rule $\|r-\mu_r\|_2^2 \lessgtr \|r\|_2^2$, matches simulation results, under perfect channel state information (CSI). It can also be seen that under perfect channel state information (CSI), compared to $N_{tr}=4$ ($N_{data}=96$), the maximum likelihood (ML) detection rule offers ~2 dB better performance than using the estimated channel. Allocating more bits for channel estimation purposes, lowers the difference between the maximum likelihood (ML) detection rule with perfect channel state information (CSI) and the maximum likelihood (ML) detection rule using the channel estimate. Specifically, for the chosen values and for 6 more training bits (6 less data bits/packet) the difference reduces from ~2 dB to ~1 dB.

The simulation results are provided under unit power Rayleigh fading for all involved wireless channels. The packet has a fixed length of $N_{tr}+N_{data}=100$ bits. The signal of the ambient illuminating carrier was modeled as a constant envelope signal with the information modeled as a zero mean Gaussian process. Channel state information (CSI) includes all the unknown parameters, including the statistics of the signal of the ambient illuminating carrier. In pseudo FSK case, full and perfect channel state information (CSI) is the state of having full and perfect knowledge of parameter $\mu_r$.

In the case of shifted BPSK, the receiver requires no information regarding the signal of the ambient carrier nor its structure. The same correlators as in pseudo FSK are used in the digital signal processing (DSP) module 450. The detection rule under shifted BPSK modulation is $\cos(2\Phi_t + \theta_{p,n}) \lessgtr 0$. Phase $\Phi_t$ is a random phase (which is considered constant for the duration of the backscattered packet) introduced by tag's operation and wireless channels. $(r_{s,n}^+)$, $(r_{s,n}^-)$ are the outputs of the two correlators for the n-th bit. The following complex number $|r_{p,n}|e^{j\theta_{p,n}} = (r_{s,n}^+)^*(r_{s,n}^-)$ can be defined for the n-th tag-backscattered bit, also defining phase $\theta_{p,n}$ for the n-th bit. Operator $(.)^*$ stands for conjugating the complex argument. Rule $\cos(2\Phi_t + \theta_{p,n}) \lessgtr 0$ is applicable when no error correction coding is utilized. It should be noted that the expressions assume perfect synchronization and carrier frequency offset (CFO) correction.

In another example, where error correction coding is utilized by the embodiment in FIG. 2, a different detection rule is implemented in the digital signal processing (DSP) module 450 of the embodiment in FIG. 4. A detection rule under (error correction) coded shifted BPSK is $$\hat{c} = \underset{c \in C}{\mathrm{argmax}} \sum_{n=1}^{N_c} w_n c_n,$$

where C stands for the set of all possible codewords of the utilized error correcting code. Weights $w_n$ are defined as $w_n = -|r_{p,n}|\cos(2\Phi_t + \theta_{p,n})$. It should be noted that the expressions assume perfect synchronization and carrier frequency offset (CFO) correction.

To acquire $\Phi_t$, estimation is performed in the digital signal processing (DSP) module 450 using $$\hat{\Phi}_t = \frac{\angle r_{1:N_{tr}}^+ (r_{1:N_{tr}}^-)^H}{2},$$

where operator $(.)^H$ stands for taking the conjugate transpose of the complex vector argument. The method utilizes a short sequence of $N_{tr}$ bits known to both the Processing Unit 240 in FIG. 2 and the digital signal processing (DSP) module 450 of the embodiment of the receiver in FIG. 4. $r_{1:N_{tr}}^+$, $r_{1:N_{tr}}^-$ are row vectors containing the output of the correlators for the $N_{tr}$ bits of the training sequence. In a different embodiment of part of the invention, other methods (e.g., exploiting some form of differential encoding or other geometrical methods) are possible.

Figure 7:
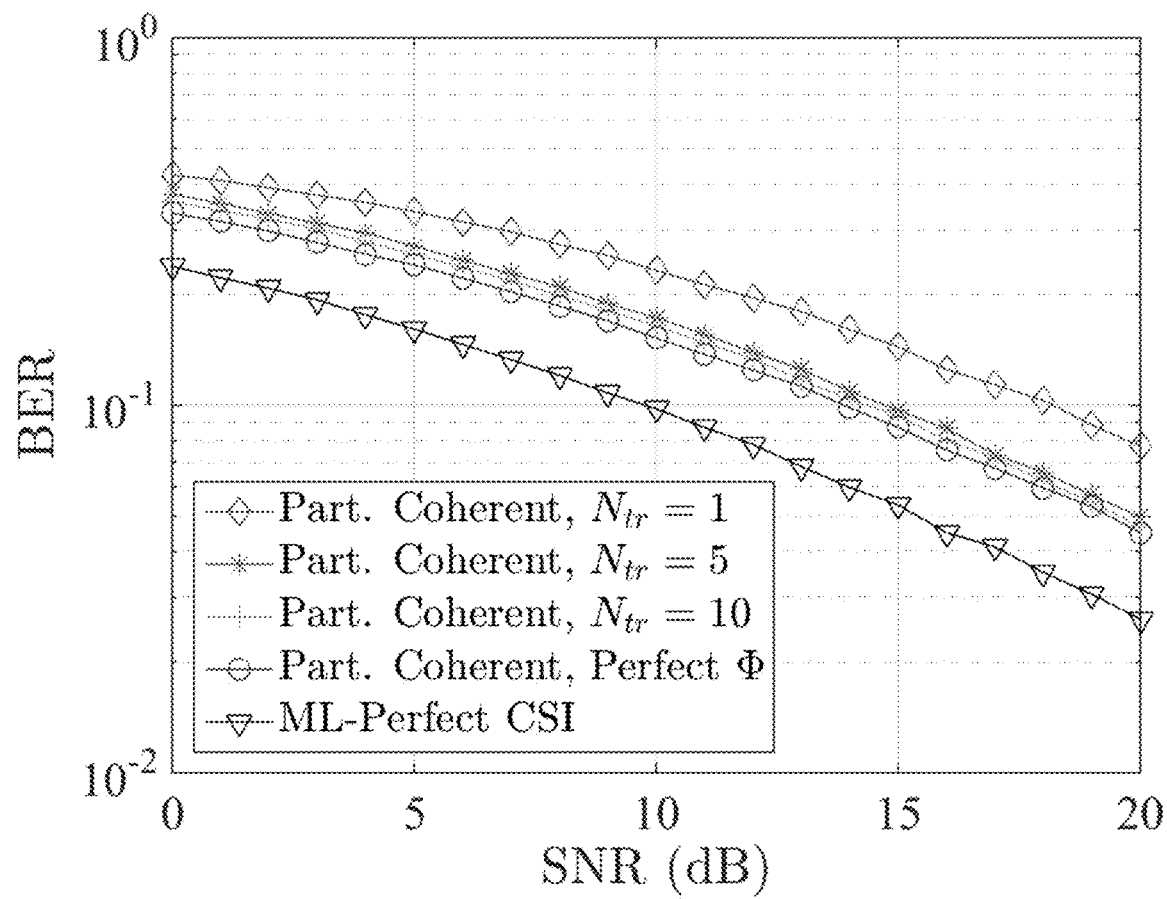
FIG. 7 shows a performance of an embodiment of the receiver for uncoded shifted BPSK.

The performance of an embodiment of the receiver for uncoded shifted BPSK, with respect to bit error rate (BER), is shown in FIG. 7. Comparison is performed between detection rule $\cos(2\Phi_t + \theta_{p,n}) \overset{0}{\underset{1}{\lessgtr}} 0$ and a maximum likelihood (ML) detection rule utilizing full (and perfect) information regarding channel state information (CSI). Detection rule $\cos(2\Phi_t + \theta_{p,n}) \overset{0}{\underset{1}{\lessgtr}} 0$ is also evaluated for the following cases: 1) available knowledge of $\Phi_t$ and 2) estimate $\hat{\Phi}_t$, for $N_{tr} = 1, 5, 10$. It can be observed that the detection rule $\cos(2\Phi_t + \theta_{p,n}) \overset{0}{\underset{1}{\lessgtr}} 0$ with perfect information regarding $\Phi_t$, offers 4 dB worst performance than the maximum likelihood (ML) detection rule utilizing full and perfect channel state information (CSI).

When no information about $\Phi_t$ is available, it can be seen in FIG. 7, that for 10 training bits, the difference between the detection rule $\cos(2\Phi_t + \theta_{p,n}) \overset{H_1}{\underset{}{\lessgtr}} 0$ utilizing perfect $\Phi_t$ and the same rule using $\hat{\Phi}_t$ instead, is approximately 0.5 dB. When 1 training bit is used, the difference increases to ≈4 dB, resulting a loss of 8 dB compared to the maximum likelihood (ML) detection rule utilizing full and perfect channel state information (CSI). The same channel and packet parameters as with the previous paragraphs were utilized throughout the simulations. Channel state information (CSI) includes all the unknown parameters, including the signal of the ambient illuminating carrier.

Figure 8:
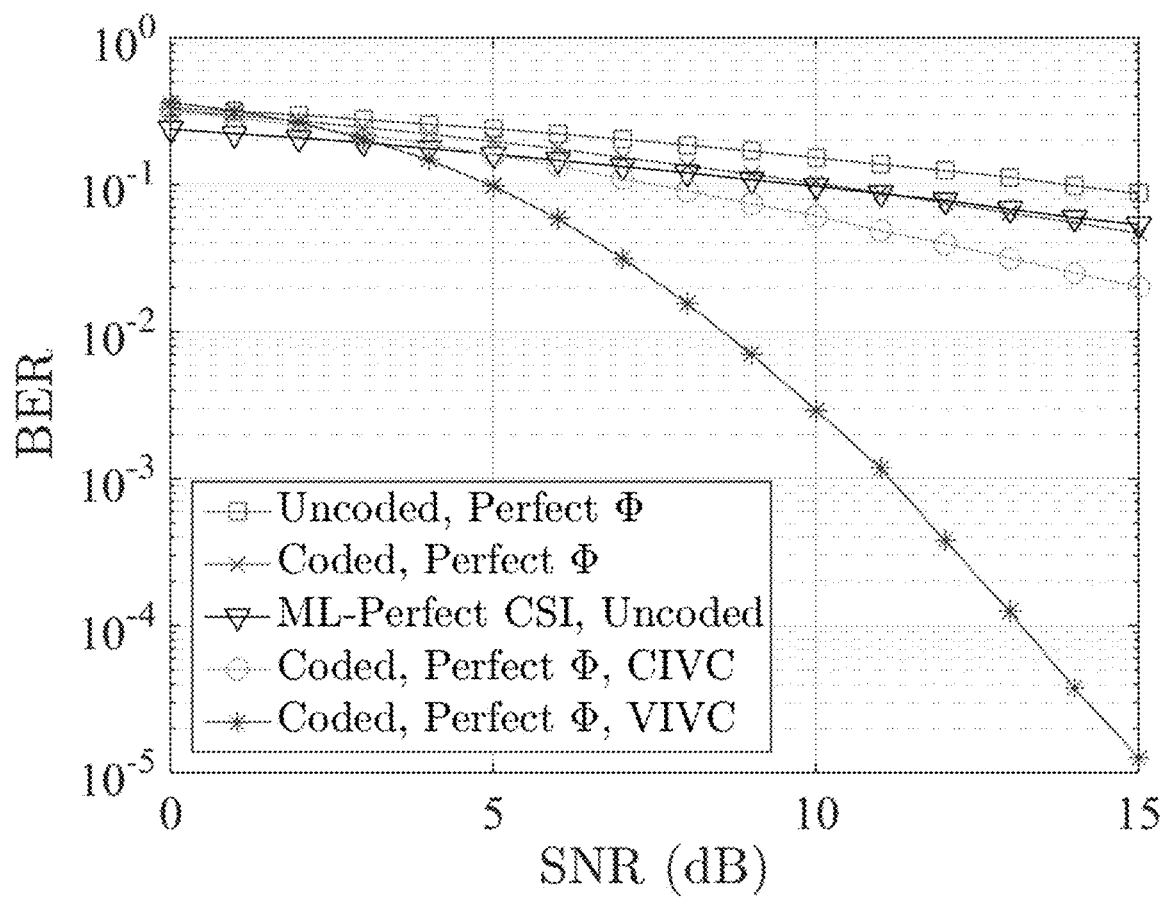
FIG. 8 shows a performance of an embodiment of the receiver for coded shifted BPSK.

The performance of an embodiment of the receiver for coded shifted BPSK, with respect to bit error rate (BER), is shown in FIG. 8. All depicted cases assume the signal of ambient illuminating carrier to be modulated. For the special case of CIVC explained below, ambient illuminating carrier is assumed constant for the duration of the tag packet, while in all other cases, it changes across consecutive tag bits. It is clear that the (coded) detection rule $$\hat{c} = \underset{c \in C}{\mathrm{argmax}} \sum_{n=1}^{N_c} w_n c_n,$$

outperforms the detection rule when no coding is utilized, $\cos(2\Phi_t + \theta_{p,n}) \overset{0}{\underset{1}{\lessgtr}} 0$. It is also observed that in the high signal-to-noise ratio (SNR) regime, the detection rule $$\hat{c} = \underset{c \in C}{\mathrm{argmax}} \sum_{n=1}^{N_c} w_n c_n$$

offers slightly better performance, compared to the maximum likelihood (ML) detection rule utilizing full and perfect channel state information (CSI), when no coding is used.

Two cases are additionally demonstrated in FIG. 8. Case where both the signal of the ambient illuminating carrier and the wireless channel parameters vary between successive bits, which will be referred to as varying illuminator varying channel (VIVC) and the case where the signal of the ambient illuminating carrier remains constant during the packet but the channels vary among consecutive bits (constant illuminator, varying channel-CIVC). In the last case, the signal of the ambient illuminating carrier was held constant for the duration of a packet.

The performance gain offered when both the signal of the illuminating carrier and the wireless channel parameters vary between successive bits, is the result of the error correcting code being fully utilized. Constant wireless channel parameters during the transmission of multiple bits may introduce correlation between the received statistics. Thus the code may not be able to offer its best performance. In a similar manner, when the signal of the ambient illuminating carrier remains constant for the duration of the packet while the channels vary (CIVC), the same reasoning can be applied. FIG. 8 shows that modulation at the ambient signal assists the coded detection rule $$\hat{c} = \underset{c \in C}{\mathrm{argmax}} \sum_{n=1}^{N_c} w_n c_n$$

and radically improves performance, even though the detection rule $$\hat{c} = \underset{c \in C}{\mathrm{argmax}} \sum_{n=1}^{N_c} w_n c_n$$

requires minimal information.

Modeling of the signal of the ambient illuminating carrier for the purposes of simulations resulting to FIGS. 7 to 8, was done using a proper zero mean complex Gaussian process. For the coded shifted BPSK, BCH (31,11) channel code was utilized.

Figure 6:
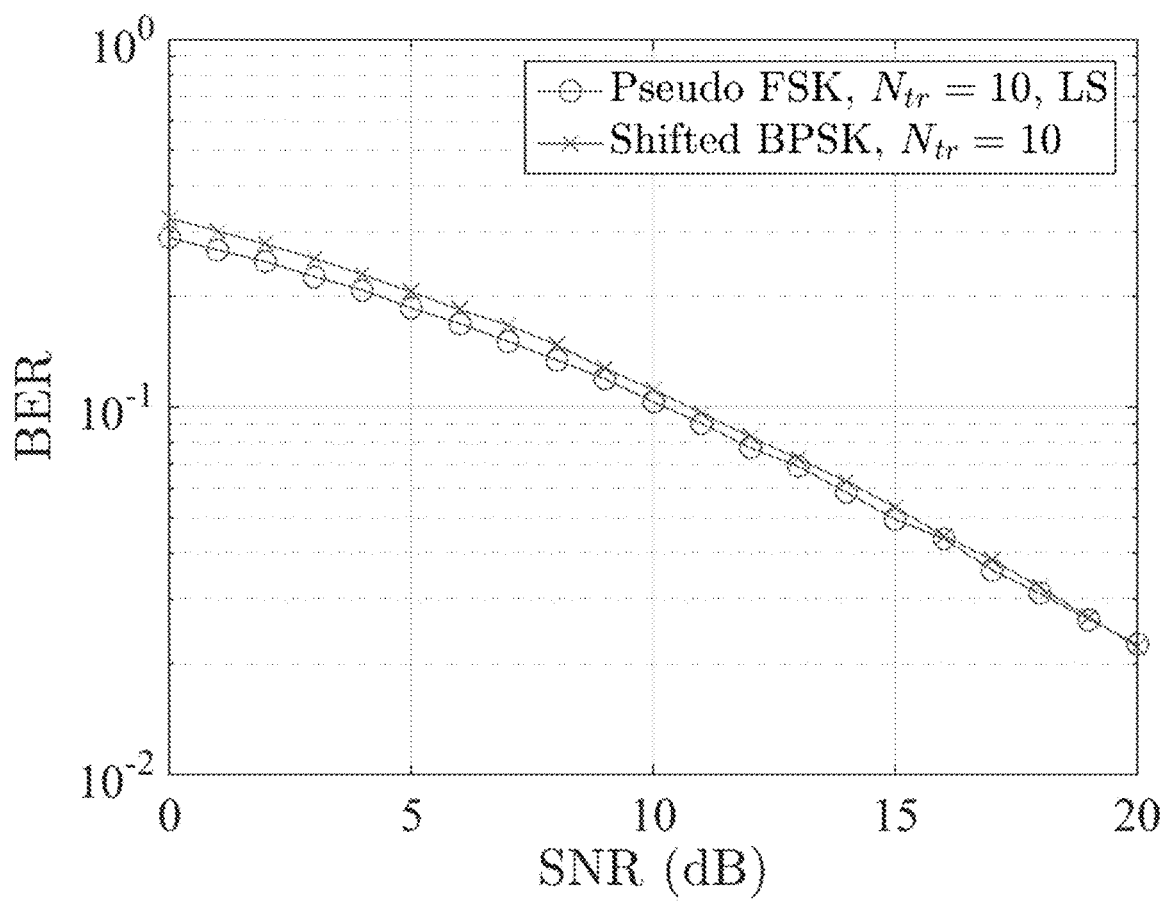
FIG. 6 shows performance of embodiments of receivers for pseudo FSK and shifted BPSK.

FIG. 6 offers a comparison between the bit error rate (BER) performance of (uncoded) shifted BPSK and pseudo FSK. The pseudo-FSK modulation outperforms shifted BPSK, at the low signal-to-noise ratio (SNR) regime, for approximately 1 dB. As the signal-to-noise ratio (SNR) increases, the gap between the two schemes decreases while for signal-to-noise ratio (SNR) ~20 dB, the gap vanishes. This behavior may be explained by the fact that the estimation method for $\Phi_t$ in the shifted BPSK is a heuristic based on the assumption of the absence of noise. Additionally, the heuristic estimation used in shifted BPSK only estimates $\Phi_t$, while the LS estimation used in pseudo-FSK, estimates the compound parameter $\mu_r$. Compound parameter $\mu_r$, except $\Phi_t$, includes tag, wireless channel and ambient illuminating carrier related parameters which are assumed constant for $N_{pack}$ bits.

In the simulations resulting FIG. 6, the signal of the ambient illuminating carrier was modeled as a constant envelope signal with the information modeled as a zero mean Gaussian process.

Methods pseudo FSK and shifted BPSK also offer advantages when signals from multiple distinct devices, which constitute embodiments of part of the invention in FIG. 2, need to be received simultaneously from embodiment of the receiver in FIG. 4.

Specifically, different $F_{sw}$ values can be utilized at each distinct device constituting embodiment of part of the invention in FIG. 2. That way multiple access in the frequency domain can be achieved and networking is attainable, without using code division (CDMA) or time domain division multiple access (TDMA).

An advantageous variation of the embodiment of part of the invention in FIG. 2 is the one of performing a passive jamming on full duplex transceivers. Processing Unit 240 continuously generates a square wave of frequency $F_{sep}$. The square wave produced is assigned to signal 241 and the Processing Unit 240 assigns to signal 242 a value such that the multiplexer 220 assigns to signal 221 the signal 241.

The operation described in the previous paragraph, results to the RF switch 211 be driven by a square wave of frequency $F_{sep}$.

A passband signal s(t) centered at $F_s$ whose frequency components are within the bandwidth of both antenna 205 and switching module 210, is assumed to impinge on antenna 205. Operation of RF switch 211 will result to the creation of attenuated versions of signal s(t). Specifically, such tag operation results to attenuated versions/copies of signal s(t), appearing at frequencies $F_s \pm F_{sep}$.

A full duplex transceiver has a frequency separation between an uplink and a downlink frequency band equal to $F_{sep}$. In an embodiment of an arrangement in FIG. 9, downlink band is located $F_{sep}$ Hz above the uplink band. When the embodiment of part of the invention in FIG. 2 is located close to the full duplex transceiver and the operation described in the previous paragraphs is utilized, attenuated versions of the transmitted (uplink) signal will appear at frequencies $F_s \pm F_{sep}$.

Figure 9:
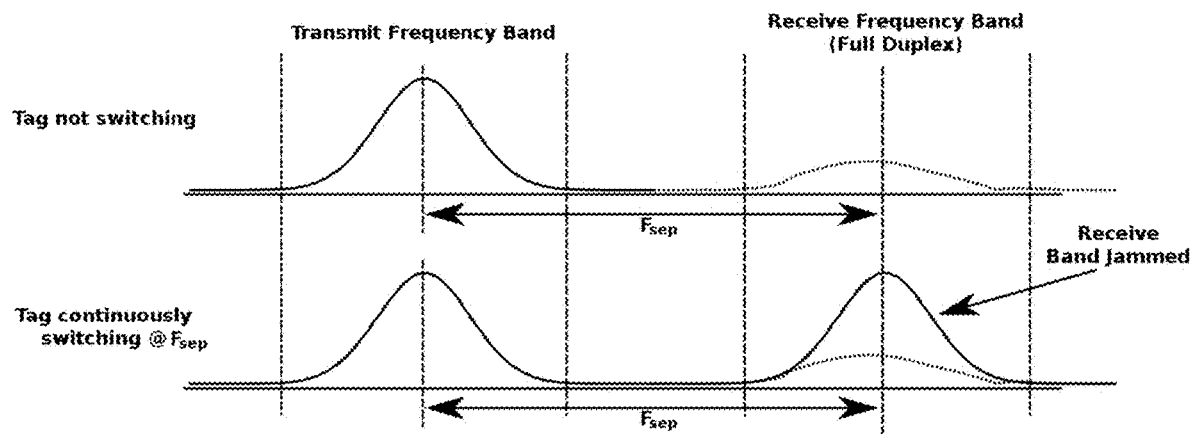
FIG. 9 shows signal jamming due to operation of an embodiment of the backscatter tag.

Operation of embodiment of part of the invention in FIG. 2, results to spectral components of the uplink (of the full duplex transceiver) signal to appear in the downlink band of the full duplex transceiver. If the signal copy received in the downlink band of the full duplex transceiver is not substantially attenuated, jamming will occur at the full duplex transceiver. The full duplex transceiver will not be able to receive information for as long as it transmits. The operation is depicted in FIG. 9.

Figure 10:
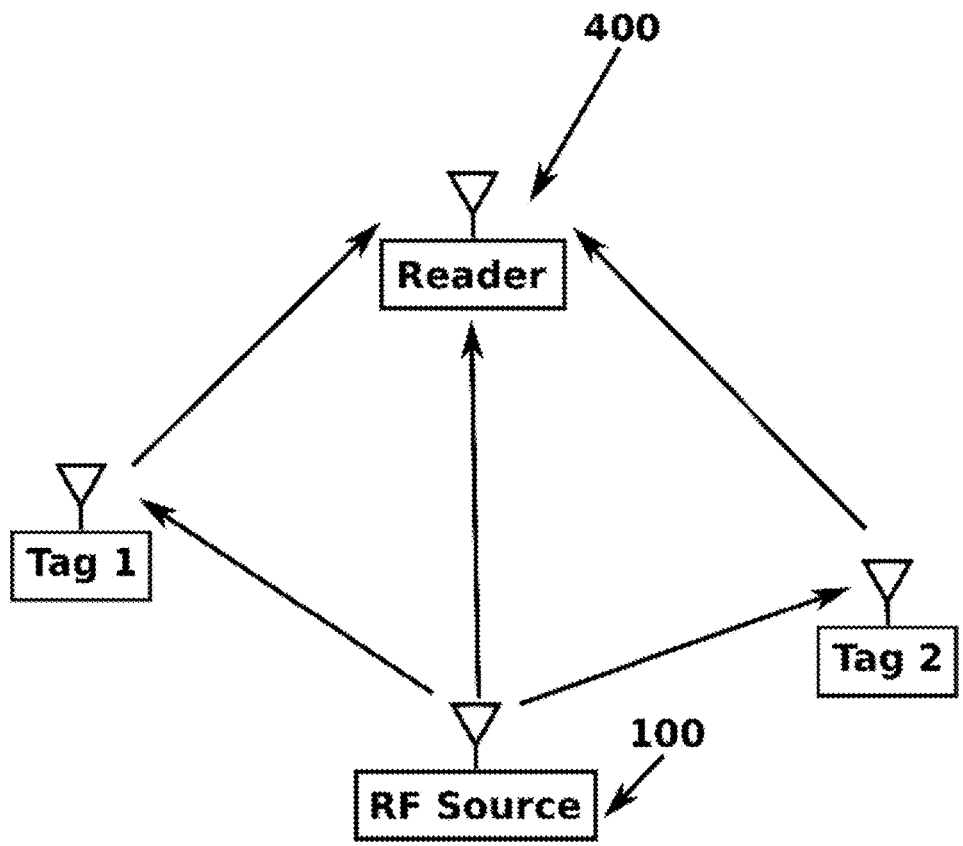
FIG. 10 shows an embodiment of a method for radio frequency (RF) source localization.

Another advantageous variation of the embodiment of part of the invention in FIG. 2 is the one for aiding RF source localization, as shown in an arrangement in FIG. 10.

Tag 1 and Tag 2 of the arrangement depicted in FIG. 10, are implementations of embodiment of part of the invention in FIG. 2.

Reader 400 in FIG. 10, is an implementation of an embodiment of the receiver 400 in FIG. 4. RF source 100 depicted in FIG. 10, is a source of a narrowband, modulated RF signal centered at $F_c$ whose location must be estimated.

Tags 1 and 2 in FIG. 10 operate as described in the previous paragraphs with, however different switching frequencies, $F_{sw}^1$, $F_{sw}^2$.

Operation of Tag 1 and Tag 2, results to the creation of additional wireless paths between the RF source and the reader.

Due to operation of Tag 1 and Tag 2, the signal emitted from RF source is now observable from 5 new frequencies, $F_c \pm F_{sw}^1$, $F_c \pm F_{sw}^2$ and $F_c$.

Observing signal of RF source 100 from 5 frequencies in total, offers signal diversity in the frequency domain. Such a diversity gain can be exploited by localization methods to achieve an overall increase in performance, with respect to localization accuracy.

Embodiment of the arrangement in FIG. 10 does not need to utilize multi-element antenna array in the Reader 400. Utilizing an antenna array would increase both the cost and the complexity involved in implementing a receiver of signals. Spatial diversity, potentially offered through utilization of an antenna array, is exchanged with frequency diversity offered by low-cost, ultra-low power embodiments of part of the invention in FIG. 2. Placing embodiments of part of the invention in FIG. 2 at distant from Reader 400 places, offers an increase in the effective antenna aperture via frequency domain diversity.

Thus, localization methods can benefit from such an embodiment of the arrangement in FIG. 10.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

REFERENCES

[Bletsas et al 12a] J. Kimionis, A. Bletsas and J. N. Sahalos, "Design and Implementation of RFID Systems with Software Defined Radio", IEEE European Conference on Antennas & Propagation (EUCAP), March, 2012, Prague, Czech Republic.

[Bletsas et al 12b] J. Kimionis, A. Bletsas, J. N. Sahalos, "Bistatic Backscatter Radio for Tag Read-Range Extension", IEEE International Conference on RFID-Technology and Applications (RFID-TA), November 2012, Nice, France.

[Bletsas et al 13] J. Kimionis, A. Bletsas and J. N. Sahalos, "Bistatic Backscatter Radio for Power-limited Sensor Networks", IEEE Global Communications Conference (GLOBECOM), December 2013, Atlanta, USA.

[Smith et al 13] V. Liu, A. Parks, V. Talla, S. Gollakota, D. Wetherall, and J. R. Smith, "Ambient backscatter: Wireless communication out of thin air," in ACM SIGCOMM, Hong Kong, China, 2013, pp. 39-50.

[Smith et al 14] A. N. Parks, A. Liu, S. Gollakota, and J. R. Smith, "Turbocharging ambient backscatter communication," in Proc. ACM SIGCOMM, Chicago, Ill., USA, August 2014, pp. 619-630.

[Smith et al 17] A. Wang, V. Iyer, V. Talla, J. R. Smith, and S. Gollakota, "FM backscatter: Enabling connected cities and smart fabrics," in USENIX Symposium on Networked Systems Design and Implementation, Boston, Mass., USA, March 2017.

[Bletsas et al 17] G. Vougioukas and A. Bletsas, "24μ Watt 26m range batteryless backscatter sensors with FM remodulation and selection diversity," 2017 IEEE International Conference on RFID Technology & Application (RFID-TA), Warsaw, 2017, pp. 237-242.

The invention claimed is:

1. A method for transmitting and receiving a sequence of binary digits comprising:
   illuminating an antenna with a constant envelope modulated RF signal having a carrier frequency;
   setting the termination of the said antenna to be one of two impedances using a switch, for communicating with the backscattering principle;
   backscattering a specific binary digit of the sequence having a logic high state by alternating the state of the said switch at a rate greater than the bandwidth of the said illuminating constant envelope modulated signal, for a duration equal to the binary digit period;
   backscattering a specific binary digit of the sequence having a logic low state by selecting one of the states of the said switch for the said duration;
   receiving a resulting backscattered signal using a homodyne receiver tuned to the said carrier frequency that includes means of time synchronization and carrier frequency offset correction and offering time synchronized and frequency corrected complex baseband samples;
   correlating the complex baseband samples with a first phasor having a frequency equal to the said state alternation rate and obtaining a plurality of first correlator outputs, each corresponding to a specific binary digit of the sequence using a digital signal processor;
   correlating the complex baseband samples with a second phasor having a frequency equal to the negative of the said state alternation rate and obtaining a plurality of second correlator outputs, each corresponding to a specific binary digit of the sequence using the said digital signal processor;
   obtaining a plurality of column vectors each having as first element each first correlator output and as second element each second correlator output using the said digital signal processor;
   acquiring a channel vector estimate using an estimator and a subset of the plurality of column vectors corresponding to a fixed number of pilot binary digits embedded in the said sequence of binary digits, using the said digital signal processor;
   assigning the logic high state to a decoded binary digit corresponding to a specific column vector of the plurality of column vectors, when the squared norm of the specific column vector is greater or equal to the squared norm of the difference between the specific column vector and the said channel estimate using the said digital signal processor; assigning the logic low state in a different case;
   iterating the said assignment for each column vector of the plurality of column vectors using the said digital signal processor.

2. A method for transmitting and receiving a sequence of binary digits comprising:
   illuminating an antenna with a constant or not-constant envelope modulated RF signal;
   setting the termination of the said antenna to be one of two impedances using a switch, for communicating with backscattering principle;
   backscattering a specific binary digit of the sequence having the logic low state by alternating the state of the said switch for a duration equal to the binary digit period, using a square wave having a fundamental frequency greater than the bandwidth of the said illuminating modulated RF signal and a random time shift being constant for the duration of the sequence;
   backscattering a specific binary digit of the sequence having the logic high state by alternating the state of the said switch for the said duration, using a square wave having the said fundamental frequency, the said random time shift and an initial time shift equal to a quarter of the inverse of the fundamental frequency;
   receiving a resulting backscattered signal using a homodyne receiver tuned to the said carrier frequency that includes means of time synchronization and carrier frequency offset correction and offering time synchronized and frequency corrected complex baseband samples;
   correlating the complex baseband samples with a first phasor having a frequency equal to the said fundamental frequency and obtaining a plurality of first correlator outputs each corresponding to a specific binary digit of the sequence using a digital signal processor;
   correlating the complex baseband samples with a second phasor having a frequency equal to the negative of the said fundamental frequency and obtaining a plurality of second correlator outputs each corresponding to a specific binary digit of the sequence using the said digital signal processor;
   arranging a number of first correlator outputs corresponding to a fixed number of pilot binary digits embedded in the said sequence of binary digits in a first training row vector using the said digital signal processor;
   arranging a number of second correlator outputs corresponding to the said fixed number of pilot binary digits in a second training row vector using the said digital signal processor;
   acquiring a phase estimate corresponding to the said random time shift by multiplying the first training row vector with the conjugate transpose of the second training row vector and evaluating the angle of their complex product, using the said digital signal processor;
   multiplying each second correlator output corresponding to a specific binary digit of the sequence, with the complex conjugate of the first correlator output corresponding to the same binary digit and obtaining a plurality of decision angles each corresponding to each of the resulting complex products using the said digital signal processor;
   assigning the logic high state to a decoded binary digit corresponding to a specific decision angle, when a cosine function having as argument the said specific decision angle added to the said phase estimate is less than zero using the said digital signal processor; assigning the logic low state in a different case; and
   iterating the said assignment for each decision angle of the plurality of decision angles using the said digital signal processor.

3. A device for transmitting information using the backscattering principles of claim 2, comprising:
- an antenna;
- a switch connected to the said antenna and configured to set the termination of the antenna between one of two impedances;
- a first multiplexer having a plurality of inputs and configured so as its output controls the state of the said switch;
- a digital processing unit configured to control the first multiplexer and having a square wave output connected to an input of the first multiplexer and having a plurality of inputs and outputs;
- a modulator configured to produce two square wave signals both having a same fundamental frequency and different initial time shifts; and
- the said modulator having a digital input connected to an output of the digital processing unit and an output to which one of the two said square wave signals is assigned depending on the state of the digital input; and
- the said modulator's output, connected to one of the inputs of the said first multiplexer;
- an analog to digital converter connected to the digital processing unit;
- an RC oscillator connected to the digital processing unit;
- a plurality of sensors interfaced to the processing unit using the said analog to digital converter;
- a plurality of sensors interfaced to the processing unit using the said RC oscillator.

\* \* \* \* \*